BEST AVAILABLE COPY

M. EICHHOLTZ,

Assignor to H. H. & J. H. Pattee & I. P. Pillsbury.

EQUALIZING-CULTIVATOR.

No. 7,738. Reissued June 12, 1877.

7,738. EQUALIZING-CULTIVATORS. Mathias Eichholtz, Troy, Ohio, assignor, by mesne assignments, to Henry H. Pattee, James H. Pattee, and Ithamar P. Pillsbury, Monmouth, Ill. Patent No. 88,557, dated Apr. 6, 1869; reissue No. 6,008, dated Aug. 11, 1874. [Filed May 28, 1877.]

*Brief.*—Beam-yoke sustains plow-beams, and is also itself sustained in an upright position.

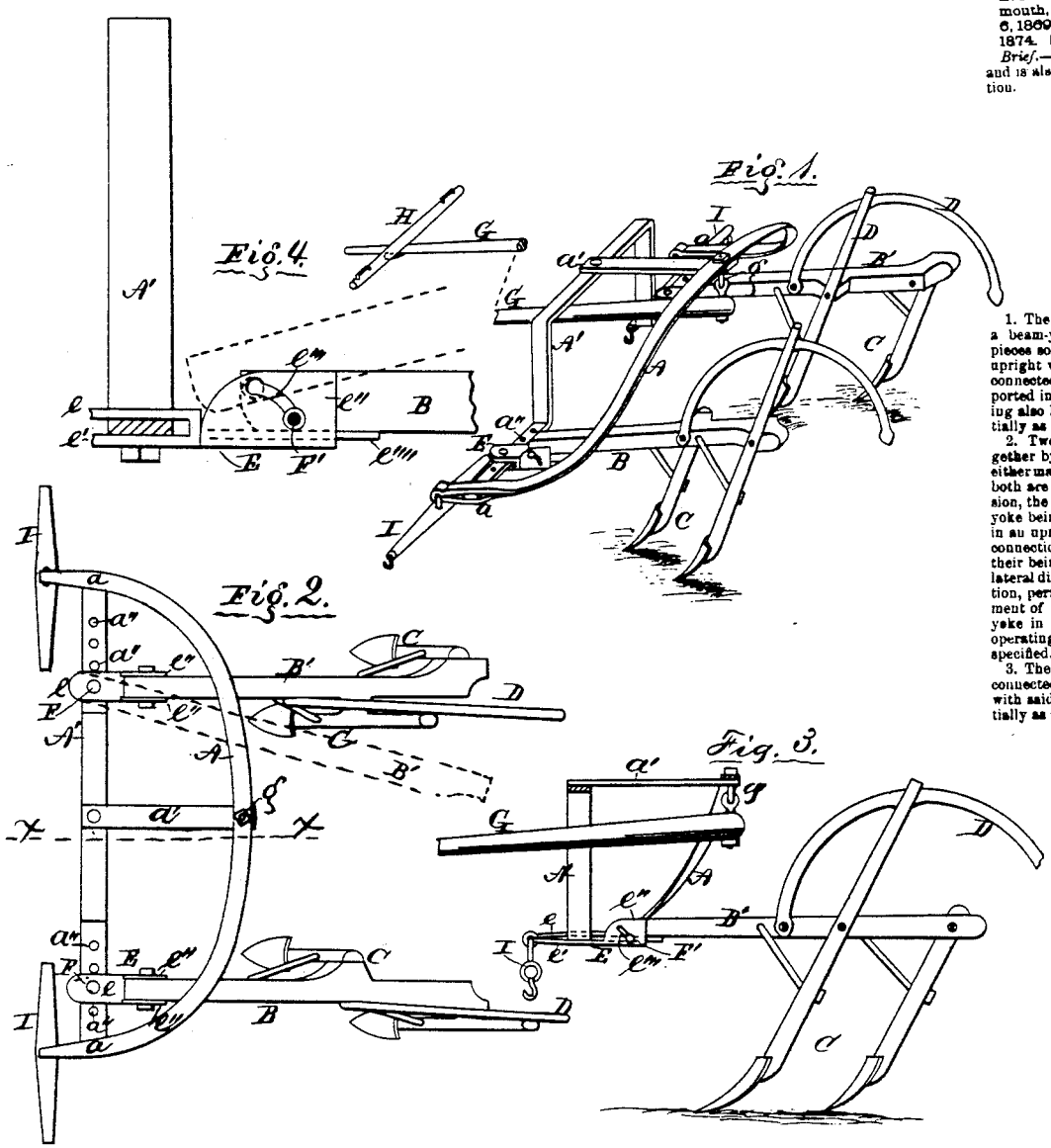

1. The combination of two plow-beams and a beam-yoke, connected together by joint-pieces so that the yoke sustains the beams in upright working position without their being connected together in rear, and is itself supported in an elevated position, the beams having also lateral and vertical motion, substantially as and for the purpose specified.

2. Two plow-beams, B B′, connected together by an elevated beam-yoke, A, so that either may operate in advance of the other while both are drawn forward in the line of progression, the attachment of the plow-beams to said yoke being by joints, which sustain the plows in an upright working position without rear connections or other support, and permit of their being freely moved independently in a lateral direction, and in a limited vertical direction, permitting the necessary vertical movement of the plows, and sustaining the beam-yoke in an elevated position, combined and operating substantially as and for the purpose specified.

3. The guide or sustaining pole G, loosely connected to the beam-yoke A, and combined with said yoke and the plows B B′, substantially as and for the purpose specified.

Witnesses:
Chas. Luffer
P. R. Richards.

Inventor:
Mathias Eichholtz,
By N. B. Richards,
Atty.

N. PETERS, PHOTO-LITHOGRAPHER, WASHINGTON, D. C.

BEST AVAILABLE COPY

UNITED STATES PATENT OFFICE.

BARTHOLOMEW BENIOWSKI, OF LONDON, ENGLAND.

IMPROVEMENT IN PRINTING.

Specification forming part of Letters Patent No. 7,738, dated October 29, 1850.

*To all whom it may concern:*

Be it known that I, BARTHOLOMEW BENIOWSKI, a Polish refugee, now residing in Bow Street, in the county of Middlesex and Kingdom of England, have invented Improvements in the Process of and Apparatus for Printing; and I do hereby declare that the following is a full and exact description thereof.

My invention of improvements in the process of and apparatus for printing relates, in the first place, to a means of facilitating the usual operations of the compositor—that is, distributing or arranging the types, blocks, spaces, &c., in cases, and composing the types, &c., from the cases into words, sentences, and paragraphs, &c., and connecting the composed matter after it has been thus brought together. These advantages are attained, first, by marking upon the four sides and lower surface of the shank of each type the same letter or character as that which is formed upon its upper surface, technically called the "face" of the type, with this difference, however, that the letter or figure I propose to mark upon the sides and lower surface of the shank of the type is not to be reversed, but to have the direct form or appearance of the letter or mark as we read it in print. This will be better understood by the following explanation. The usual appearance of a number of types (suppose the lower-case alphabet) in the composing-stick is inverted and reversed, as represented in Sheet I of the accompanying drawings at Figure 1. The appearance of the same line of types, with their faces touching the bottom of the composing-stick, their nicks being toward the compositor and their lower surfaces upward, marked with the corresponding letters, will be, as shown at Fig. 2, just as we are accustomed to read them when printed.

For the better illustration of my invention, I have shown at Figs. 3 and 4 perspective views of one of my improved types, suppose letter a. The first of these figures shows the face of the type with the letter a formed thereon reversed, as in ordinary printing-types. The second of these figures shows the under part of the same type with the same letter, a, upon its under surface. The sides of the type in both figures are seen likewise marked with the same letter in its direct position, so that whatever part of the type presents itself to the compositor it will be readily recognized. These my additional letters on the lower surface and sides of the shanks of the type may be produced by a variety of means—viz., by writing, painting, engraving, casting, or etching. The simplest way is to mark these letters with pen and ink or writing-fluid of any color. Chloride of gold or chloride of platinum answers best. These additional letters may be marked upon the shank of the types in different colors, so as to make a distinction between capitals, small capitals, and small letters, (technically called "lower-case letters.") Each particular font may be marked in the nick with a particular sign, at the option of the type-founder. Foreign alphabets—as Greek, for instance—are marked in like manner with the foreign letter, or they may be marked with the corresponding English letter. As the operation of marking the types by hand would, however, be a work of some time, and would consequently be expensive, I sometimes do this in a more effectual and durable and at the same time more economical manner by either of the following ways: First, by casting the requisite letters or marks, not only on the sides or bottom of the type, but on the lower end thereof, in intaglio, at the same time that the type is made, so that when the type is removed from the mold it will be found to present, not only the proper letter in relief on its face, but also the same letter in intaglio at its lower end and on its sides, but not reversed. In order to do this I have made some trifling alterations in and additions to the ordinary type-founder's mold, as will be seen by referring to the accompanying drawings, in which—

Figs. 1*, 2*, and 3*, Sheet II, represent three different sectional views of a type-mold with my improvements adapted thereto and certain alterations made therein to render it more suitable for the intended purpose. Fig. 1* is a longitudinal vertical section taken through the mold in the line 1 2 of Fig. 2*, which represents a horizontal section of the same, taken in the line 3 4 of Fig. 1*; and Fig. 3*, is a transverse vertical section taken in the line 5 6 of Fig. 1*.

Instead of the mouth of the mold being, as usual, above the foot of the type, it is on the upper side of what is technically called the "body" of the mold.

In Figs. 1* and 2*, *a a* is the mouth, which, through the groove or channel *b*, communicates with the space *c*, in which the shank of the type is cast, as usual. *d d* are registers on the upper end of the mold, their construction being exactly like that of the usual registers, *d** *d**, on the lower end of the mold. The office of these upper registers is to receive a metal piece, *e*, having a matrix in relief made thereon. This upper or additional matrix in relief is shown detached and on an enlarged scale in Fig. 4*, and is intended to produce by casting a sunk letter at the lower end of the type, the letter not being inverted, but exactly like that we read in printed books. Square holes are made through the carriage of each half of the mold, and similar square holes are made through the body of each half of the mold. Into each of these four holes fits tightly a rod of brass or iron, *f f f f*. (Shown only by dots in Figs. 1* and 2*.) On the inner end of each of these rods is a letter very slightly in relief and similar to that on the face of the type. The other end of this rod is screwed, and carries a female thumb-screw, *g*. By means of this thumb-screw I adjust the rod in such a manner that the letter on its other end shall not protrude beyond the hole more than about one-hundredth of an inch, and this protruding letter will naturally produce in casting an intaglio letter on the corresponding side of the shank of the type. The operation of casting and dressing the type is conducted in the usual way, except that first, after having poured the metal into the mold, I remove the upper matrix, as well as the lower one, before I proceed to separate the two halves of the mold for the purpose of taking out the type. The "jet," or superfluous metal, not being, as usual, on the foot of the type, the mode of planing off the break must consequently be conducted in a somewhat different manner, viz: I arrange the types horizontally, with the breaks upward, and then plane them off with a plane, the stock of which is suitably shaped for this purpose. It might at first be supposed that there would be a difficulty in the delivery of the cast type on account of its being hemmed in by the four lateral protruding rods *f f*. This, however, is not the case, as the type metal expands while solidifying, and immediately after shrinks sufficiently to allow of an easy delivery. Care must only be taken to suitably adjust the above rods, and the proper amount of adjustment must be ascertained by a few experimental castings of each individual sort, and also according to the particular composition of the type metal employed.

Another means of marking the types on their sides with the proper letters for the purpose already explained is by the employment of the electrotype process, whereby the signs or letters may be rendered more visible on the shank of the type, the said letters having been first made thereon in intaglio, either by casting, stamping, engraving, or in any other suitable manner.

The process of depositing metals will be so well understood that it will not be necessary to give any detailed description thereof, as it does not differ in any way from the processes already known and in use. If, when the types are marked by writing or printing, some non-conducting coloring material—as, for instance, Brunswick black—is employed for the purpose, the type will be covered with the deposited metals upon all parts except those protected by the coloring-matter. I also propose, under this head, to coat printing-types, except their faces, with some innoxious material—such as varnish—or by chemical means with some metal—such as gold, silver, platinum, or copper—which will not be injurious to the health of the compositor when brought into contact with the most delicate portions of the body, such as the organ of touch or the lungs. The types may be coated with these metals by merely throwing them into solutions of the metals, such as sulphate of copper, the chlorides of gold, platinum, or silver, or other solutions of these metals.

My second improvement consists in employing for letter-press printing (besides the usual sorts) types which are cast together with a space at their sides, as shown in Fig. 5* in Sheet II. These types are used at the end of words or in other places where they may be required—such as at the end of a series of figures—my object being to save a portion of the usual labor of composing and distributing, and also to be able to put the types into the composing-stick vertically, with the faces downward and the sunk letters upward, and set up or compose from left to right, just in the manner as letter-press printing is read. It will be evident to any practical printer that the types could not be composed or set up with their faces downward if the spaces were not united to the final letters, as the spaces would slip down to the bottom of the composing-stick, and in printing a blotch instead of a white interval at the end of each word would be produced. It will, however, be necessary to make use of a few spaces of the ordinary kind at the end of each line for the purpose of "justifying," and also of the usual leads, which would of course produce in printing the above-mentioned blotches. This inconvenience, however, can be easily remedied by pushing these few spaces and the leads down before the "form" is submitted to the printing operation. This extra labor is amply counterbalanced by the economy just mentioned, but more particularly so by the facility that the improvement of casting intaglio letters at the lower end of type gives to obtaining stereotype castings, sometimes termed "polytyping."

In reference to polytyping, I think it advisable, in order to be as intelligible as possible, to make the following extract from the seventh edition of the Encyclopædia Britannica, article "Type-founding," head "Polytypage," written and also published separately by Hansard in 1841: "Mr. Heran (in France) hit upon

BEST AVAILABLE COPY a novel and ingenious mode of polytyping. This was the formation of a set of types the very reverse of the common—viz., instead of the letter being in relief upon the shank, it was in intaglio. Therefore every separate letter would be a die, and instead of the letter being reversed it would stand as read on the paper. The spaces, quadrats, leads, &c., were of the exact height of the type. These were to be composed like types, so that the entire page would present the appearance of a plate of copper into which words, &c., had been punched. The matter was to be read in the metal without a proof, which, as the words read from left to right, was a matter of no difficulty. Upon the matrix thus composed fused metal was to be pressed, which would obviously form a complete plate fit to be printed from, and the operation could be repeated until as many plates were struck off as were required." This mode succeeded and has been employed in France, but has lately been entirely neglected, as the composition thus formed by Heran could only serve the purpose of polytyping or producing stereotype-plates, but evidently not for printing, whereas I make my types as above described, having on one end the usual letter for the purpose of being printed from, and on the other end a sunk letter for the purpose of polytyping by pressing into it gutta-percha or any other suitable material, or, what I should prefer, by pouring upon it fused Newton's or any other fusible metal, in the manner of the stereotype process. One difficulty remains—viz., for printing the spaces must be of less height than the types. Therefore, when, for the purpose of facilitating composition and polytyping, I put the types with the sunk letters upward, these spaces would slip down, and consequently spoil the object of polytyping. By casting the spaces with the final letters, as above mentioned, all this is evidently remedied. These final letters I may put in one and the same compartments with the usual letters, as the compositor will easily distinguish them by their size and shape, or by their being variously colored, from the corresponding usual letters of which the words, &c., are composed, and therefore the "case" will be no more complicated than it at present is.

In connection with this head of my invention I propose to make the spaces and quadrats either of iron or of wood, or some of iron and some of wood. One object is to render the spaces cheaper and lighter, and another is to facilitate the operation of separating such spaces and quadrats from the other types or blocks, which I do by the use of a magnet, and by water, as will be hereinafter more minutely described. These spaces and quadrats may be painted of various colors, and are to be varnished to protect them from the action of the water.

My third improvement is designed to facilitate the "distribution" of types by arranging considerable numbers of types of one kind in distinct tubes, each belonging to its particular letter or type. This feature consists of an apparatus which I call the "type-store," formed by a number of vertical tubes of a square, round, or any other suitable form, about one foot long, as shown in Sheet I at Fig. 5, and several combined at Fig. 6, the lower ends of these tubes being closed. The dimensions of the horizontal or cross-sections of each of these tubes must be less than the usual height of types in order to prevent the types tumbling over in the tubes when they are introduced therein. The respective types are delivered from the hands of the distributer, each into its proper tube, the tubes being severally marked on the outer side with the letter indicating the "sort" it is to contain.

For the better understanding of this part of my invention I will describe my manipulations relating to distributing. The page or form of composed types, blocks, and spaces is unlocked and placed in a flat tray a few inches deep and of convenient size. I then spread the types loosely, separating them and causing them to lie upon their long surfaces or sides by pressing with the hand in such a manner as that they shall form an even layer upon the tray, taking care, as far as possible, that none of the types shall be heaped upon one another. I then pass either a permanent or temporary magnet of suitable power over the whole surface of the types. All the iron spaces will of course be attracted by and adhere to the magnet. I then remove them from the magnet and place them in their respective tubes of the type-store above described. Next I pick up out of the tray, by hand, all the "logotypes" and "phrasotypes" (which I will describe hereinafter) and place them upon a board in alphabetical order in vertical columns. I then pour water into the tray, to the surface of which the wooden spaces and wooden quadrats will of course rise all at once. These wooden spaces I remove, and, having dried them in the usual manner of drying types, I place them in their respective tubes of the type-store. The water having been allowed to escape from the tray and the types dried, I then select the several types and place them, with their faces upward, in their respective tubes of the type-store. The types, as they are introduced into their respective tubes, slide down and arrange themselves side by side, and as the tube fills they stand one upon another, but always in the same erect position, as the width of the tube will not admit of their falling over into cross positions.

At Fig. 6*, Sheet III, I have shown a perspective view of another apparatus which is a modification of that described in Fig. 6, Sheet I, and still more facilitates the sorting or distributing operation. The series of tubes A A A composing the store are precisely similar to those just described; but they are placed in a box attached to a small table, B, upon which a small heap of the types intended to be sort-

BEST AVAILABLE COPY ed or distributed is placed. This table is also furnished with a small dish or shallow saucer, C mounted at the upper end of a rod, D, which passes through a hole in the table B, and when the types are to be sorted the boy places a few in the dish or saucer C, and by taking only a few at a time he can quickly sort them and place them in their proper tubes. When sorting the type he holds the rod D in his left hand, and can thereby turn the dish or saucer C round, as may be necessary, in order to recognize more quickly the different letters.

My fourth improvement consists in an apparatus for the purpose of facilitating composition. This apparatus I call the "authoriton." A number of square tubes equal to the number of sorts in use (one of which is shown in Fig. 7) are to be combined. The length of each tube is about one foot and a half, and in height and width about half an inch, (a little smaller than the usual length technically called "height of types.") The end of the tube marked with *, Fig. 7, is to be turned towards the compositor. Both ends are open. At the end * a portion of the upper side of the tube must be removed for the distance of about half an inch; but this removed portion of the tube must be always shorter than the usual height of types. At the other end of the tube a portion of the upper side is also removed to the extent of about one inch and a half. A suitable number of these tubes is arranged and combined as shown in perspective at Fig. 8. These tubes are severally marked with a letter indicating the letter each tube is to contain. Figs. 9 and 10 are geometrical representations of the authoriton. The former is an elevation, the latter a horizontal view, and the tubes are there shown connected together by cramps. Each of these respective tubes I fill with a suitable number of types with their faces toward the compositor. This I accomplish by taking a corresponding tube of the type-store and holding it in an inclined direction toward the horizon, with its open end close over the back part of the tube of the authoriton. The types will thereby naturally lodge themselves in this receiving-tube, with their faces all in the same direction toward the compositor. Having thus transferred a suitable number of types, I place in the back part of each tube of the authoriton a parallelopiped of wood, about three inches long, (see Fig. 11,) the cross-section of which is a trifle smaller than the cross-section of the interior of the tube, so that this parallelopiped may easily be pushed forward. This parallelopiped, which I call the "pusher," serves the purpose of pushing the types forward until their faces reach exactly the front end of the tube. When the types visible at this portion of the tube are exhausted by composition, a new supply is forwarded by pressing on the pusher; or, if preferred, the tubes may be made as shown in Fig. 5*, Sheet II, in which the end is closed up, an aperture being, however, left to take up the types. By this I can, if required, dispense with the pusher, as the authoriton may be set at an angle, so as to allow the types to slide down themselves. I pick up the required types by means of suitable tweezers of about the shape and dimensions shown in Fig. 12, and place such types consecutively in the usual composing-stick, with their faces touching its bottom; or I place the types in the compartments of what I call the "copying-stick," which is placed on the table close to the authoriton. Fig. 13 is a horizontal view of the copying-stick. Fig. 14 is a front elevation of the same, and Fig. 15 represents its cross-section. The length of the copying-stick is about ten inches. The width is equal to the usual length technically called the "height" of the types. There is a vertical ledge round three sides of the bottom of this copying-stick, leaving the front open. Its height is equal to about two "em-quadrats" of the kind of types in which I am composing.

There are a series of vertical partitions made of some pliant and elastic substance—as sheet india-rubber—inserted into the bottom of the copying-stick. Their height above the bottom is about one-tenth of an inch. Their length, *p i*, from the back is about half an inch. They are fixed in suitable grooves cut in the bottom of the copying-stick. The other three margins of these partitions are free, so that they will easily yield or incline either to the right or left. The widths or spaces between these compartments thus formed are equal to about one em-quadrat of the kind of types in which I am composing, except the last at the right end, which is about an inch. In placing the types in the copying-stick I care not on which of their sides they happen to fall from the tweezers, provided they lie with their faces toward me. Wherever double letters occur I pick up the two letters together and place them both in the same compartment. Wherever logotypes and phrasotypes occur I place them upon the elastic partitions. They will naturally cover several compartments, and so I continue to the end of the stick. I put nothing into the large right-hand compartment, which is merely for the purpose of allowing room in case of a logotype or phrasotype ending the stick. I proceed, filling one stick after another and place one before another, the back of each stick touching the faces of the types in the adjoining stick behind it. Fig. 16 shows two sticks full of the composition of types—say the Lord's prayer. Having filled a suitable number of these sticks and read them over, I hand them to a justifying-boy, who puts one type after another into the usual composing-stick, and exactly in the usual manner—viz., with the feet touching the bottom of the composing-stick and the nicks upward—and he places spaces when he meets with an empty compartment of the copying-stick, which spaces are placed before him in a few ordinary boxes.

The further operations of carrying over the

BEST AVAILABLE COPY composed matter to the galley, the chase, &c., until the "locking-up," inclusively, is performed in the ordinary manner. Having taken a proof and marked the corrections, I turn the locked-up form upside down—viz., the faces of the types downward—placing suitable pieces of wood under the sides of the chase. It is self-evident that the operation of correcting will be greatly facilitated by my letters marked on the lower surfaces of the types, which I can read as easily as a printed page. The drawing out of the types I perform more easily than in the usual manner on account of my handling the bodkin very boldly, as I care very little about scratching the lower surfaces of the types, while in the usual manner of correcting the slipping of the bodkin very often produces scratches on the faces of the types; and with regard to my spaces, I care very little how roughly I handle them, they being very cheap. Having made all the corrections, I hand over the form to the pressman, who goes on printing in the usual manner from the inked faces of the types. He will look to the first printed sheet whether there are any spaces standing too high, which he can easily press down and tighten, if required, by driving boldly a small sharp wedge into one or more of the wooden spaces.

My fifth improvement I call "poly-composing," by which I understand a process of making two, three, or more compositions of the same copy with greater expedition and less expense than this could possibly be done in the usual manner. This I achieve by proceeding exactly as above described for the production of a single composition, with this difference, that I transfer from the authoriton, or from the usual cases, to the copying-stick two, three, or more types of the same character at the same time. Suppose, for instance, I had to make two, three, or more compositions of the word "London:" I take two, three, or more L's at once from the authoriton and place them in one compartment of the copying-stick. Next I do the same with the same number of O's, N's, D's, O's, and N's. The thus filled sticks pass successively from one justifying-boy to another, each being instructed to take only one of the two, three, or more letters lying in the same compartment, leaving the remaining types to be operated upon by his next neighbor. Every one will easily guess the modifications to be made in the dimensions of the copying-stick and its compartments in compliance with the greater or less number of compositions required to be produced. Should I wish to have one composition in one kind of types (suppose diamond) and another composition of the same copy in pica, I arrange my authoriton accordingly—viz., I devote two consecutive tubes to one and the same letter, one diamond and the other pica. Instead of having one copying-stick, I have two, one placed before the other—one for diamond and the other for pica. Suppose I have to compose the word "London" in diamond and in pica. I transfer diamond L to the diamond-stick; next pica L to the pica-stick; next, diamond O, pica O, &c. The diamond-stick I give to one justifying-boy, the pica to another, and both go on as above described simultaneously. It is self-evident that I may direct one justifying-boy to justify page and impose for 18mos and another for 4tos, folios, &c. Any particular directions the compositor may have to give to the justifying-boys or others he may mark down with a pencil on the bottom of the copying-stick, the bottom of the copying-stick being always covered with the best white drawing-paper, which marks are rubbed out with india-rubber after they have served their purpose.

Having now described my various improvements and the manner of carrying the same into effect, I would observe, in conclusion, that in order that my present improvements may be perfectly understood I have found it necessary to represent and describe various things that are already known. I do not, however, intend to claim any of such well-known parts as constituting any part of my present improvements; nor do I intend to confine myself rigidly to the precise arrangement or construction of parts as herein shown and described, as they may doubtless be varied in some particulars without departing from the nature and object of my invention; but that which I consider to be new in the above-described improvements, and therefore wish to claim as the invention secured to me by Letters Patent, is—

1. Marking on the shank and foot of types by any convenient means—such as writing, engraving, casting, or electrotyping—the same letter or character which is formed on its upper surface, and also the method herein shown and described of casting the intaglio letters on the shank and foot of the types at the same time that the type itself is cast.

2. Making types having, in combination with the usual letters in relief on the face of the type, intaglio letters on the foot thereof for the purpose of serving as matrices from which to obtain a polytype-plate, while the types themselves will serve for printing.

3. Casting spaces on the sides of ordinary type for the purpose above mentioned, as above described.

4. The peculiar mode herein shown and described of poly-composing either from the ordinary cases or from what I call the "authoriton."

5. The process and apparatus herein shown and described for facilitating the sorting and distributing of types and spaces, and making part of them of wood and iron, so that the wooden portion may be separated by means of water, the iron ones by a permanent or temporary magnet, and the others into their several receptacles by hand, the workman being considerably assisted in this operation by the type being marked on their sides.

BEST AVAILABLE COPY

6. The apparatus shown in Figs. 8, 9, and 10, which I denominate the "authoriton," and also of the use of the copying-sticks shown in Figs. 13, 14, and 15 for the purpose of facilitating composition, by which the above-described types are brought into a convenient space for composing from, as hereinbefore described.

In witness whereof I, the said BARTHOLOMEW BENIOWSKI, have hereunto set my hand and seal this 13th day of January, in the year of our of Lord one thousand eight hundred and forty-nine.

BARTHOLOMEW BENIOWSKI. [L. S.]

Witnesses:

J. W. MOFFATT,

FRED. WALKER,

*Clerks to Newton & Son, 66 Chancery Lane, London.*